United States Patent
Chun

(10) Patent No.: US 10,360,143 B2
(45) Date of Patent: Jul. 23, 2019

(54) PARALLEL USE OF INTEGRATED NON-VOLATILE MEMORY AND MAIN VOLATILE MEMORY WITHIN A MOBILE DEVICE

(75) Inventor: Christopher Kong Yee Chun, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 888 days.

(21) Appl. No.: 12/828,815

(22) Filed: Jul. 1, 2010

(65) Prior Publication Data

US 2012/0004011 A1    Jan. 5, 2012

(51) Int. Cl.
*G06F 12/00* (2006.01)
*G06F 12/02* (2006.01)
(Continued)

(52) U.S. Cl.
CPC ...... *G06F 12/0223* (2013.01); *G06F 11/1456* (2013.01); *G06F 12/0638* (2013.01); *G06F 11/1441* (2013.01); *Y02D 10/13* (2018.01)

(58) Field of Classification Search
CPC ............. G06F 12/0223; G06F 11/1441; G06F 12/0638; G06F 11/1456; Y02B 60/1225
See application file for complete search history.

(56) References Cited

U.S. PATENT DOCUMENTS 4,959,774 A * 9/1990 Davis ........................ G06F 1/30
365/228
5,515,540 A * 5/1996 Grider et al. .................... 726/33
(Continued)

FOREIGN PATENT DOCUMENTS

EP    1132819 A2    9/2001
GB    2291991 A    2/1996
(Continued)

OTHER PUBLICATIONS

Marc Rawer et al. d/b/a The Game Boy Group. "The Game Boy Project." Department of Sensor Systems Technology, Fachhochschule Karlsruhe. Retrieved in relevant part May 22, 2001. Paginated compilation retrieved Aug. 9, 2004. http://marc.rawer.de/Gameboy/ <http://marc.rawer.de/Gameboy/Docs/GBProject.pdf>.*
(Continued)

*Primary Examiner* — Francisco A Grullon
(74) *Attorney, Agent, or Firm* — Muncy, Geissler, Olds & Lowe, P.C./Qualcomm

(57) ABSTRACT

A mobile device having parallel use of non-volatile memory and main memory is presented. The mobile device includes a volatile memory, a non-volatile memory, a memory controller functionally coupled to the non-volatile memory and the volatile memory, and a processor coupled to the memory controller. The processor addresses both the non-volatile memory and the volatile memory utilizing a continuous memory map. Alternatively, a mobile device may include a volatile memory, a non-volatile memory, a memory controller coupled to the volatile memory, a processor coupled to the memory controller. The processor may address the volatile memory during normal operation. The mobile device may further include a shadow copy controller coupled to the non-volatile memory and the memory controller, where the shadow copy controller copies information stored in a designated portion of the volatile memory into the non-volatile memory.

15 Claims, 5 Drawing Sheets

(51) Int. Cl.
*G06F 11/14* (2006.01)
*G06F 12/06* (2006.01)

(56) References Cited

U.S. PATENT DOCUMENTS

| | | | | |
|---|---|---|---|---|
| 5,887,270 | A * | 3/1999 | Brant | G06F 11/167 |
| | | | | 711/153 |
| 5,937,433 | A * | 8/1999 | Lee et al. | 711/158 |
| 7,080,198 | B1 * | 7/2006 | Young | G06F 11/2087 |
| | | | | 711/114 |
| 8,041,879 | B2 * | 10/2011 | Erez | G11C 11/005 |
| | | | | 711/103 |
| 8,074,034 | B2 * | 12/2011 | Sartore | 711/162 |
| 8,127,168 | B2 * | 2/2012 | Maeda | G06F 1/3203 |
| | | | | 713/300 |
| 2001/0019509 | A1 * | 9/2001 | Aho et al. | 365/205 |
| 2003/0028733 | A1 | 2/2003 | Tsunoda et al. | |
| 2003/0145020 | A1 * | 7/2003 | Ngo et al. | 707/201 |
| 2003/0154009 | A1 * | 8/2003 | Basir et al. | 701/35 |
| 2004/0103238 | A1 * | 5/2004 | Avraham et al. | 711/102 |
| 2004/0210796 | A1 * | 10/2004 | Largman et al. | 714/20 |
| 2005/0204091 | A1 * | 9/2005 | Kilbuck | G06F 12/0802 |
| | | | | 711/103 |
| 2005/0278481 | A1 * | 12/2005 | Lakhani et al. | 711/103 |
| 2006/0018227 | A1 | 1/2006 | Nakajima | |
| 2006/0053246 | A1 | 3/2006 | Lee | |
| 2006/0294339 | A1 * | 12/2006 | Trika et al. | 711/202 |
| 2008/0301256 | A1 * | 12/2008 | McWilliams et al. | 714/758 |
| 2009/0198902 | A1 * | 8/2009 | Khmelnitsky et al. | 711/135 |
| 2010/0023681 | A1 | 1/2010 | Sinclair et al. | |
| 2010/0080048 | A1 * | 4/2010 | Liu et al. | 365/157 |
| 2010/0106904 | A1 * | 4/2010 | Berke | G06F 11/1441 |
| | | | | 711/114 |
| 2010/0110748 | A1 | 5/2010 | Best | |
| 2010/0153633 | A1 * | 6/2010 | Yang | G06F 12/0223 |
| | | | | 711/104 |
| 2011/0087833 | A1 * | 4/2011 | Jones | G06F 12/0866 |
| | | | | 711/104 |

FOREIGN PATENT DOCUMENTS

| | | |
|---|---|---|
| JP | 2003091463 A | 3/2003 |
| JP | 2004039229 A | 2/2004 |
| JP | 2005115720 A | 4/2005 |
| JP | 2006085557 A | 3/2006 |
| JP | 2006218969 A | 8/2006 |
| JP | 2007504521 A | 3/2007 |
| JP | 2007122754 A | 5/2007 |
| JP | 2007148905 A | 6/2007 |
| JP | 2007317224 A | 12/2007 |
| JP | 2008511929 A | 4/2008 |
| JP | 2009533770 A | 9/2009 |
| JP | 2010140130 A | 6/2010 |
| WO | 2006011186 A1 | 2/2006 |
| WO | 2006026645 A2 | 3/2006 |
| WO | 2007121181 A1 | 10/2007 |

OTHER PUBLICATIONS

Gras et al. "RESET Roadmap for European research on Smartcard Related Technologies." Report, final. University of Twente, Netherlands, 2003.*

Howe, Denis. "Write-Through," Jun. 12, 1996. The Free On-line Dictionary of Computing, 2010, available at <http://dictionary.reference.com/browse/write-through>.*

Handy, Jim. The Cache Memory Book, 2nd ed. Academic Press, 1998, pp. 64-67, 224.*

Misek, Rob. "Read-Through, Write-Through and Write-Behind Caching." Oracle Coherence Knowledge Base, Jan. 26, 2006. <http://coherence.oracle.com/pages/viewpage.action?pageId=4229092>.*

International Search Report and Written Opinion—PCT/US2011/042526—ISA/EPO—dated Nov. 11, 2011.

* cited by examiner

PARALLEL USE OF INTEGRATED NON-VOLATILE MEMORY AND MAIN VOLATILE MEMORY WITHIN A MOBILE DEVICE

FIELD OF DISCLOSURE

Disclosed embodiments are related to mobile device memory architectures. More particularly, the embodiments are related to improving the power cycling characteristics of a mobile device using various volatile and non-volatile memory configurations.

BACKGROUND

With the increasing capabilities of modern mobile devices and their corresponding increase in usage, power considerations of mobile devices across various modes of operation can become increasingly important. For example, under certain conditions, the loss of power to the mobile device can result loss of the contents of data stored in volatile memory. Such power losses may result from unintentional power disruptions due to an impact of the mobile device (such as dropping the phone which can disconnect the battery), or a battery which has become depleted due to not receiving a timely recharge. In other situations, a user may intentionally cause a power disruption in order to circumvent security measures, such as, for example, entry passcodes, identity and/or financial credentials, digital rights management, etc. In the most common situation, a power disruption can occur when a user simply shuts down, or turns off completely, the mobile device. After such a power disruption, the conventional mobile device may have to perform a cold reboot in order to return to normal operation.

FIG. 1 represents a conventional mobile device wherein the power states may be monitored and/or controlled by a Power Management Integrated Circuit (PMIC) 130. Power can be supplied/controlled by the PMIC to a plurality of components within the mobile devices (shown as block 105), including the processor 110, Non-volatile memory (e.g., flash memory) 150 and a Synchronous Dynamic Random Access Memory (SDRAM) 140 during the normal operation of the mobile device, such as, for example, calling and/or responding to an incoming call. The PMIC may further supply, monitor, and/or control power to other subsystems and/or components within the mobile device 100 which are not shown. The processor 110 may include logic for mobile device operation and analog interfaces, and can further include one or more microprocessors and/or Digital Signal Processors (DSPs). SDRAM 140 such as shown in FIG. 1 is a subset of Random Access Memories (RAMs) in general. RAM can be stand alone devices and/or can be integrated or embedded within devices that use the RAM, such as microprocessors, microcontrollers, application specific integrated circuits (ASICs), system-on-chip (SoC), and other like devices.

RAM can be volatile or non-volatile. Volatile RAM loses its stored information whenever power is removed. Non-volatile memory (e.g., flash memory) can maintain its memory contents even when power is removed from the memory. Although flash memory has advantages in the ability to maintain its contents without having power applied, it may have slower read/write times than volatile RAM. Moreover, there may be limitations regarding the number of write operations which can be performed on a flash memory.

When the mobile device performs a cold-reboot (after an intentional or unintentional power disruption as discussed above), repowering the device may typically result in a time-consuming reboot of the processor and other subsystems in the mobile device. In conventional systems, the processor/system state and other information used in rebooting the mobile device may be stored in flash memory. The reboot process may copy information from the flash memory back into volatile main memory. This process may be slow, in part due to the lack of speed associated with flash memory. Additionally, the reboot sequence can be processor and system intensive, and thus can consume a significant amount of battery power.

Accordingly, given the aforementioned conventional memory configurations, system designers may contend with challenging compromises between mobile device performance, power consumption, security and usability.

SUMMARY

The disclosed embodiments are directed to apparatus and methods for improving the operational performance and security of a mobile device by utilizing various parallel configurations of volatile and non-volatile memory.

An embodiment can comprise a mobile device which may include a volatile memory, a non-volatile memory, and a memory controller functionally coupled to the non-volatile memory and the volatile memory. The non-volatile memory may comprise a Magnetoresistive Random Access Memory (MRAM) and/or a Spin Transfer Torque MRAM (STT-MRAM). The embodiment may further include a processor coupled to the memory controller, where the processor may address both the non-volatile memory and the volatile memory utilizing a continuous memory map.

Another embodiment may comprise a mobile device which may include a volatile memory, a non-volatile memory, and a memory controller coupled to the volatile memory. The non-volatile memory may comprise a Magnetoresistive Random Access Memory (MRAM) and/or a Spin Transfer Torque MRAM (STT-MRAM). The embodiment may further include a processor coupled to the memory controller, where the processor may address the volatile memory during normal operation. A shadow copy controller may be coupled to the non-volatile memory and the memory controller. The shadow copy controller may be included which can copy information stored in a designated portion of the volatile memory into the non-volatile memory.

In yet another embodiment, a method for managing non-volatile memory in a mobile device is presented. The non-volatile memory may comprise a Magnetoresistive Random Access Memory (MRAM) and/or a Spin Transfer Torque MRAM (STT-MRAM). The method may include determining a power mode of the mobile device, and determining that a power interruption did not occur based upon the power mode. The method may further include accessing volatile memory for processing operations, and copying information stored in a predetermined portion of volatile memory into non-volatile memory.

BRIEF DESCRIPTION OF THE DRAWINGS

The accompanying drawings are presented to aid in the description of embodiments and are provided solely for illustration of the embodiments and not limitation thereof.

DETAILED DESCRIPTION

Figure 1:
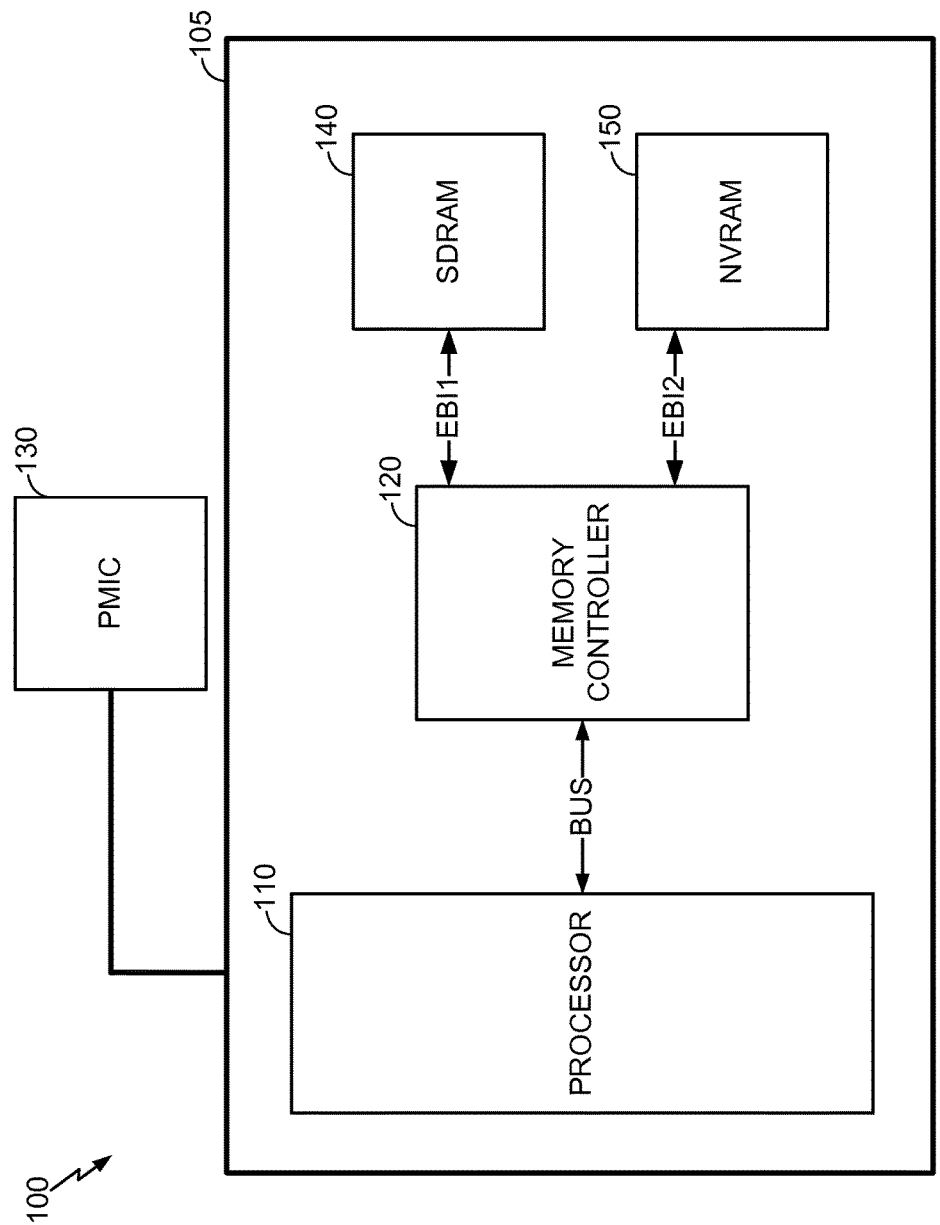
FIG. 1 illustrates a block diagram of a mobile device having a conventional memory configuration.

Aspects of the embodiments are disclosed in the following description and related drawings directed to such embodiments. Alternate embodiments may be devised without departing from the scope of the invention. Additionally, well-known elements used and applied in the embodiments will not be described in detail or will be omitted so as not to obscure the relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of the various embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As used herein, the term "normal operation" may refer to a state where the mobile device may perform routine operations, such as, for example, transferring voice and/or data packets, paging, displaying data, surfing the internet, etc., after a normal cold-boot or instant on boot process. Normal operations do not apply to the mobile device restarting after an uncontrolled power disruption event where the system state data may have been lost.

As used herein, the term "power disruption" may refer to any type of event where power to the processor is interrupted. This may include a controlled power disruption event wherein the mobile device may go through an orderly process to sleep or shutdown, whereby the system state of the mobile device may be preserved. Controlled power disruptions may result from, for example, a sleep command, a shut down, or a power cycle which may be initiated by the user. The processor may restart from a controlled power disruption either by performing a "warm reboot" or a "cold reboot." In a warm reboot, which also may be referred to an "instant-on", the mobile device may quickly return to an operational state. During a cold reboot, the processor state cannot be restored and the full boot process must be followed, and thus can take much longer to return to an operational state.

As used herein, the term "uncontrolled power disruption" refers to an event where power to the processor is interrupted and the system state of the mobile device may not be preserved. An uncontrolled power disruption may result from an impact of the mobile device or a depleted battery. In other situations, a user may intentionally cause an uncontrolled power disruption to circumvent security measures such as, for example, passwords, identity and/or financial credentials, digital rights management, etc.

The term "cold reboot" refers to a power cycling event where a processor may restart from a complete power interruption, and not rely on fast non-volatile memory recover the system state. During a cold reboot, the processor may perform system initialization by reading start-up data from slower types of non-volatile memory (e.g., conventional flash memory), and/or may obtain initialization data from read only memory (ROM).

As used herein, the term "mobile device" may refer to any type of wireless communication device which may transfer information over a network. The mobile device may be any cellular mobile terminal, personal communication system (PCS) device, portable data units such as personal navigation devices, GPS enabled devices, laptops, set-top boxes, music players, video players, personal digital assistant, fixed location data units such as meter reading equipment, or any other suitable device that stores or retrieves data or computer instructions or any combination thereof.

The mobile device may be capable of receiving and processing network and/or Satellite Position System signals. Moreover, as used herein, the term "network" may refer to any wireless communication network, including a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more Radio Access Technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. Although the Figures below illustrate remote units according to the teachings of the disclosure, the disclosure is not limited to these exemplary illustrated units. Embodiments of the disclosure may be suitable employed in any device which includes active integrated circuitry include memory and on-chip circuitry for test and characterization.

The foregoing disclosed devices and methods are typically designed and configured into GDSII and GERBER computer files, stored on a computer readable media. These files are in turn provided to fabrication handlers who fabricate device based on these files. The resulting products are semiconductor wafers that are then cut into semiconductor die and packaged into a semiconductor chip. The chips may then be employed in devices described herein.

Figure 2:
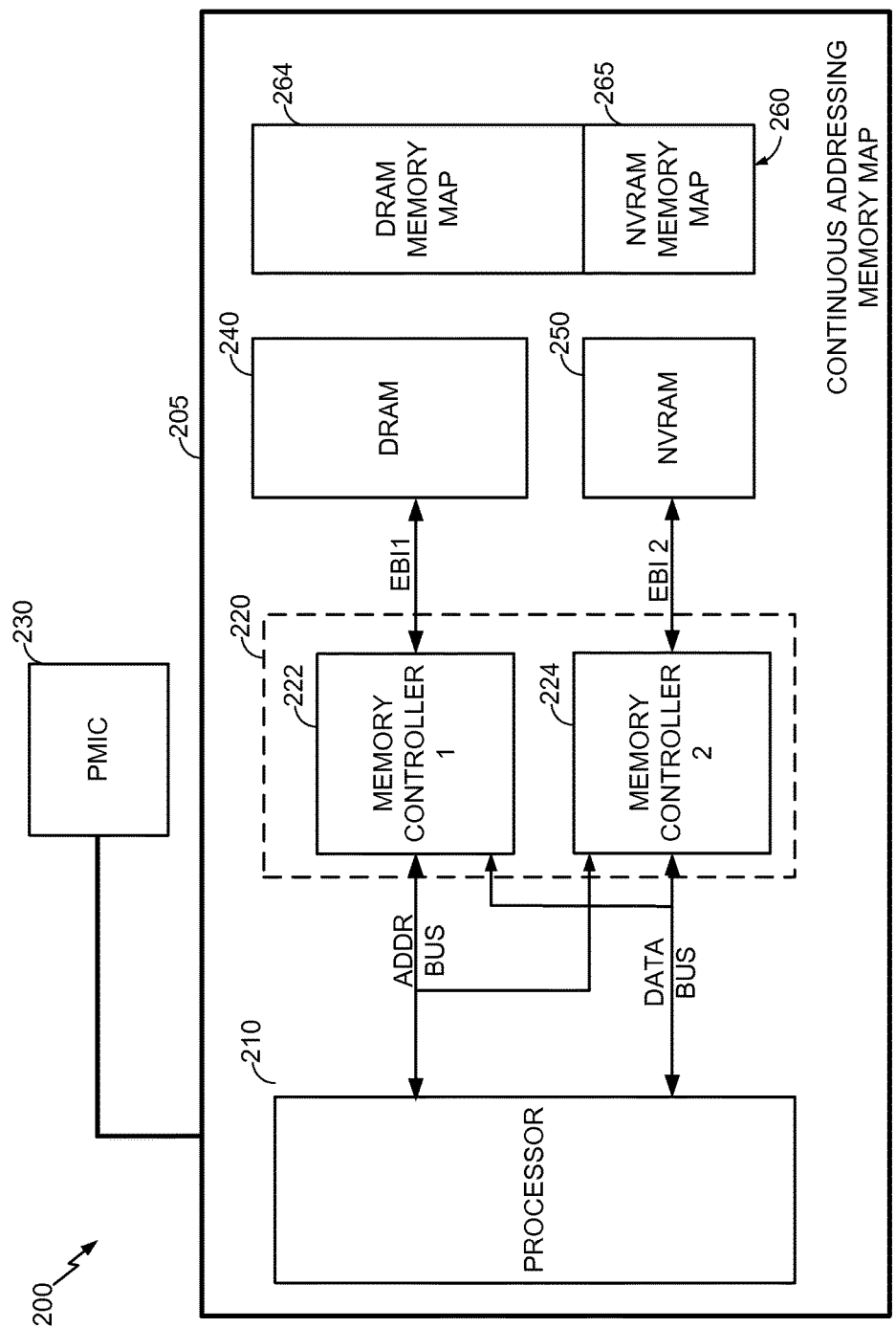
FIG. 2 illustrates a block diagram of an exemplary mobile system having a memory configuration using a continuous addressing memory map.

FIG. 2 illustrates a block diagram of an exemplary mobile system 200 having a memory configuration using a continuous addressing memory map 260. Other well known elements and features of the mobile device such as the user interface, antenna, battery, transceivers, memory managers, etc. will not be illustrated or described herein for brevity. Likewise, well known processes/algorithms performed by the mobile device, such as receiving and decoding pages, sleep cycles, paging cycles, memory management, etc. will not be discussed in detail herein. However, it will be appreciated these well known elements and processes are included in mobile devices in embodiments of the disclosure.

In the mobile device 200, the continuous addressing memory map 260 may be divided wherein one portion of the map can be associated with volatile memory, and another portion of the map can be associated with non-volatile memory. The non-volatile portion of the map may be reserved for storing information associated with the system state, security, digital rights management, or other information that can be desirable to preserve in the event of an uncontrolled power disruption. The other portion of the map may be associated with volatile memory, and can be used to store information other information, include data which is not critical to security or the state of the system.

Further referring to FIG. 2, the mobile device 200 may include volatile memory 240 and non-volatile memory 250. Each memory may interface to a memory controller 220. The memory controller 220 may be a single controller, or it can be divided into separate controllers, for example, memory controller 1 222, and memory controller 2 224. In the embodiment 200 shown, different controllers may be dedicated to different memory types to facilitate differing signal and interface specifications (e.g., timing requirements, voltage levels, impedance matching, etc.). Each memory controller 222, 224 may transfer data over a separate External Bus Interface (EBI). The memory controller 220 may interface to processor 210 over separate address and data buses. Finally, a Power Management Integrated Circuit (PMIC) 230 may supply and manage power states to components and/or subsystems within the mobile device (exemplified as block 205 in FIG. 2).

In further detail, the processor 210 may access both volatile memory 240 and non-volatile memory 250 using a continuous memory map 260. The continuous memory map 260 can be randomly accessed by a set of address values. One range of address values may map to the volatile memory map 264 (corresponding to physical volatile memory 240), and another range of values may map to the non-volatile memory map 265 (corresponding to physical non-volatile memory 250). The processor may select which data to store to protect from power disruptions by selecting the appropriate memory addresses corresponding to non-volatile memory map 265. The types of data which the processor may wish to select for storage in non-volatile memory 250 may include system state data, security data, Digital Rights Management (DRM) data, or any other data that should be preserved when power is interrupted to the mobile device 200. By storing security data in non-volatile memory 250, it may be protected from users attempting to circumvent security systems by intentionally disrupting their power. In other embodiments, mobile device 200 may also recover from power cycling much faster by storing system state data in non-volatile memory 250, thus providing an "instant-on" capability.

Random Access Memory (RAM) can be volatile or non-volatile. Volatile RAM loses its stored information whenever power is removed. Non-volatile RAM can maintain its memory contents even when power is removed from the memory. Although non-volatile RAM has advantages in the ability to maintain its contents without having power applied, conventional non-volatile RAM, typically taking the form of Flash memory, may have slower read/write times than volatile RAM. Flash memory may also have limitations on the number of times it can be written to before it starts to malfunction. Magnetoresistive Random Access Memory (MRAM) is a non-volatile memory technology that has response (read/write) times comparable to volatile memory. In contrast to conventional RAM technologies which store data as electric charges or current flows, MRAM uses magnetic elements. The nonvolatile memory of MRAM provides fast access time which may be comparable to the access time of DRAM. Additionally, MRAM may also provide for a substantially greater number of write operations before failure, when compared with the limited number of write operations available for flash memory. Volatile memory 240 may be any type of dynamic random access memory (DRAM), including synchronous DRAM (SDRAM). Non-volatile memory 250 can be any type of RAM which preserves memory without the application of power, and be sufficiently fast enough to work in conjunction with non-volatile memory 240 and processor 210. In one embodiment, non-volatile memory 250 may utilize MRAM given its aforementioned advantages over conventional flash memory.

Through the parallel use of volatile memory 240 and fast non-volatile memory 250, the mobile device 200 may provide faster power cycling capability by avoiding cold reboots. Additionally, by storing security data in non-volatile memory 250, the mobile device 200 may prevent the circumvention of security measures featured in the mobile device 200.

Figure 3:
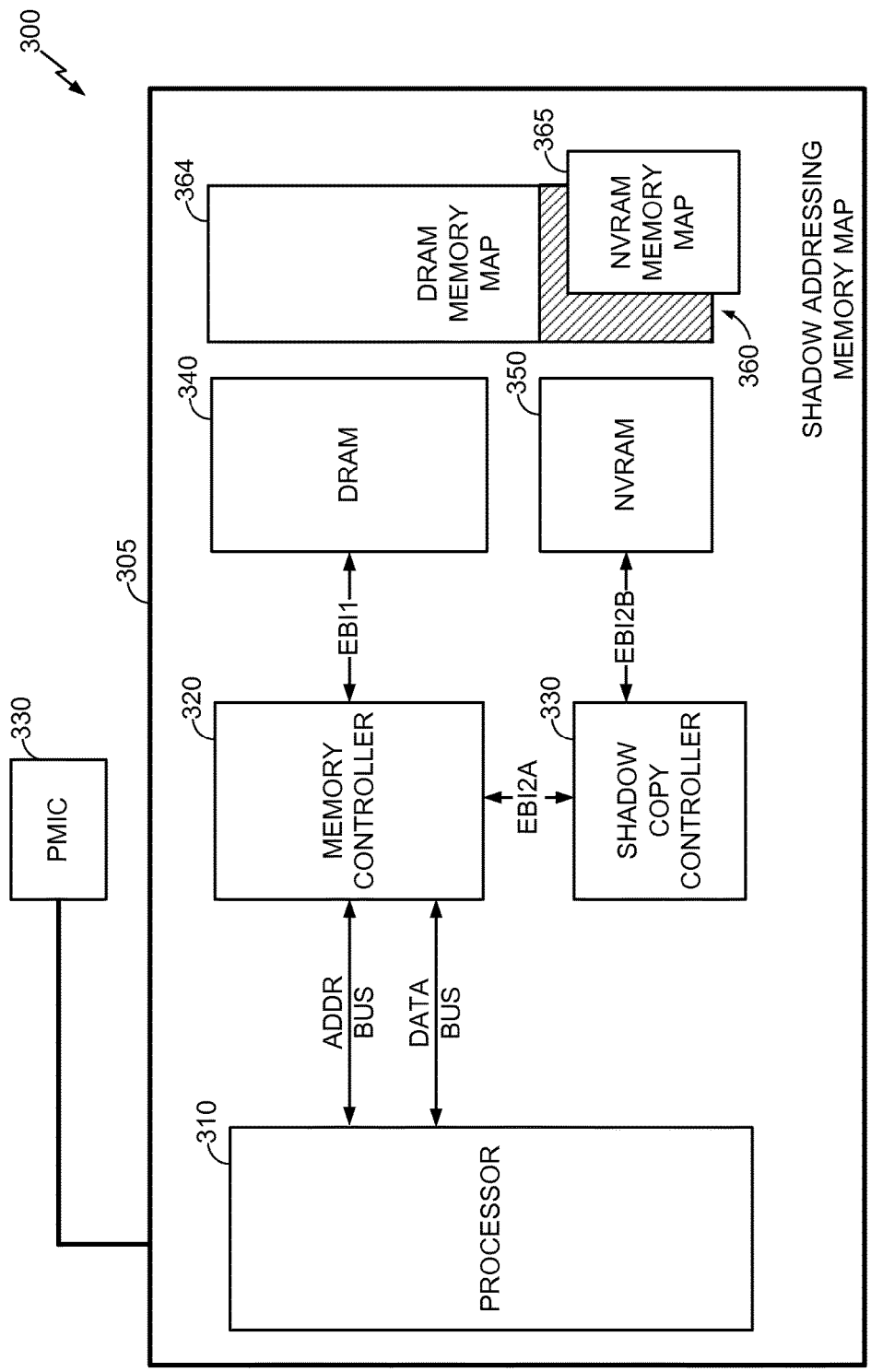
FIG. 3 illustrates a block diagram of an exemplary mobile system having a memory configuration using a shadow addressing memory map.

FIG. 3 illustrates a block diagram of an exemplary mobile device 300 having a memory configuration using a shadow addressing memory map 360. Other well known elements and features of the mobile device such as the user interface, antenna, battery, transceivers, memory managers, etc. will not be illustrated or described herein for brevity. Likewise, well known processes/algorithms performed by the mobile device, such as receiving and decoding pages, sleep cycles, paging cycles, memory management, etc. will not be discussed in detail herein. However, it will be appreciated these well known elements and processes are included in mobile devices in embodiments of the disclosure.

In the mobile device 300, the shadow addressing memory map 360 may include one larger map 364, used by the processor for normal operations, which may be associated with volatile memory. Another parallel memory map 365, which is associated with the non-volatile memory, may shadow a portion of the volatile memory map 364 (wherein FIG. 3 the shadowed portion is shown as the shaded section of map 364). The shadowed portion of the volatile memory map 364 may be copied into the non-volatile memory as its state is changed, thus providing a continuous "back-up" from data loss resulting from a power disruption. The shadowed portion of the volatile map 364 may be reserved for storing information associated with the system state, security, digital rights management, or other information that can desirable to preserve in the event of an uncontrolled power disruption. The non-shadowed portion of the volatile memory map 364 can be used to store other data which is not critical to security nor the state of the system.

Further referring to FIG. 3, the mobile device 300 may include volatile memory 340 and non-volatile memory 350. Volatile memory 340 may interface to a memory controller 320 over External Bus Interface 1 (EBI1). Non-volatile memory 350 may interface to memory controller 320 through a shadow copy controller 330. The shadow copy controller 330 can facilitate the differing signal and interface specifications (e.g., timing requirements, voltage levels, impedance matching, etc.) which may be associated with the non-volatile memory 350, versus the volatile memory 340. The shadow copy controller 330 may interface to non-volatile memory 350 over EBI2B, and interface to the memory controller 320 over EBI2A. The memory controller 320 may interface to a processor 310 over separate address and data buses. Finally, a Power Management Integrated Circuit (PMIC) 330 may monitor and manage power states of components and/or sub-systems included in the mobile device, which is illustrated as block 305 in FIG. 3.

During normal operation, the processor 310 may access the volatile memory 340 through the memory controller 320 using the volatile memory map 364. The volatile memory map 364 can be randomly accessed by a range of address values, including those which are "shadowed" by non-volatile memory 350. The processor may select which data to store to protect from power disruptions selecting storage addresses corresponding to the section of the volatile memory map 364 which is shadowed by non-volatile memory map 365 (also hereinafter referred to as "shadowed storage"). The types of data which the processor may selected for shadowed storage may include system state data, security data, Digital Rights Management (DRM) data, or any other data that should be preserved when power is interrupted to the mobile device 300. By storing security data in shadowed storage, it may be protected from users attempting to circumvent security systems by intentionally disrupting their power. In other embodiments, mobile device 300 may also recover from power cycling much faster by storing system state data in non-volatile memory 350, thus providing an "instant-on" capability.

In the event the system sensing a power disruption, the PMIC 330 may provide the power state information to the processor 310. Upon the reapplication of power, the processor 310 may use the power state information to read the contents of non-volatile RAM 350, via shadow copy controller 330, using the non-volatile memory map 365. In the event of a controlled power down, an uncontrolled disruption, and/or sleep command, the processor 310 may restart itself using prior system state data which was preserved in non-volatile memory 350. Using fast non-volatile memory 350 can allow the mobile device 300 to restart quickly (also known as an "instant on" mode) and thus save time and power. In the event of a user-initiated power down designed to circumvent security measures, security information may be left intact using non-volatile memory 350, and thus be used by the processor 310 to ensure that the security processes restart without being compromised.

Volatile memory 340 may be any type of dynamic random access memory (DRAM), including synchronous DRAM (SDRAM). Non-volatile memory 350 can be any type of RAM which preserves memory without the application of power, and be sufficiently fast enough to work in conjunction with non-volatile memory 340 and processor 310. In one embodiment, non-volatile memory 350 may utilize MRAM given its aforementioned advantages over conventional flash memory.

Figure 4:
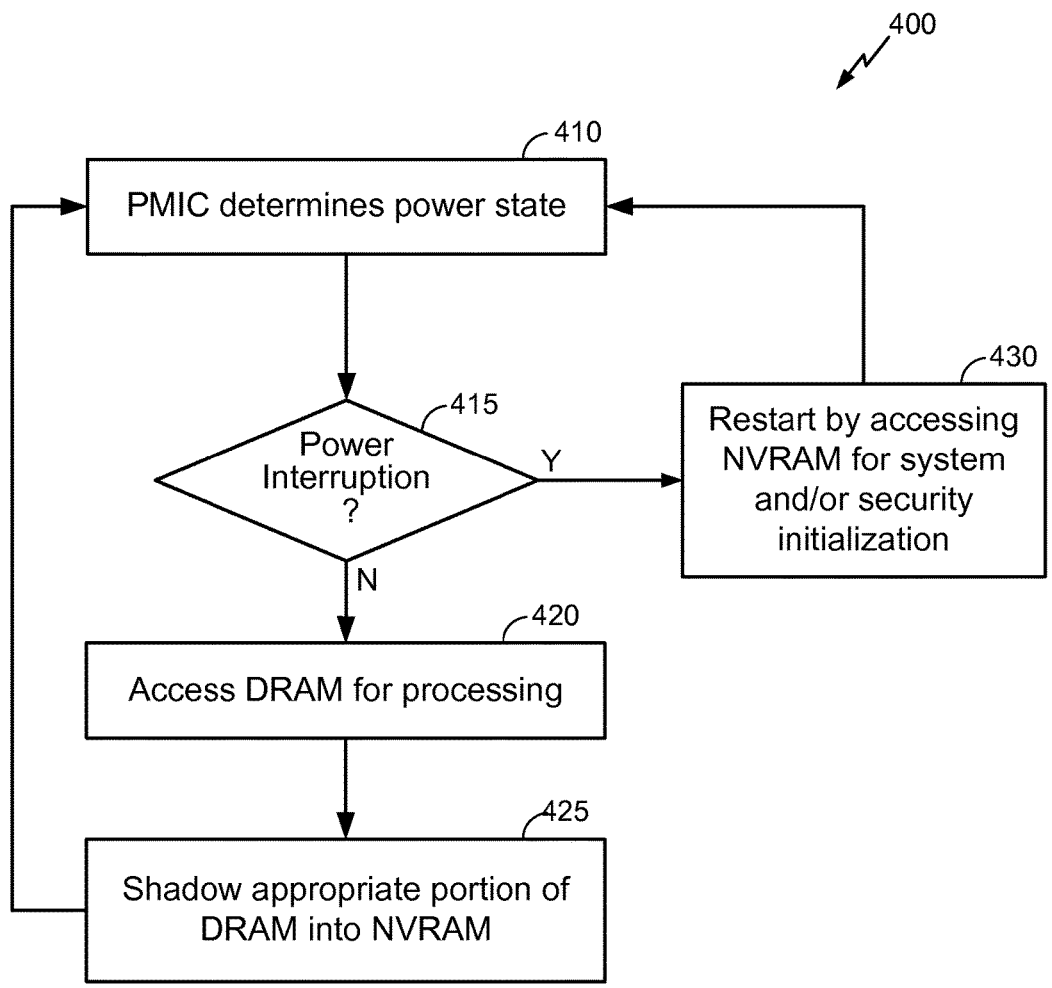
FIG. 4 shows a flow chart illustrating an exemplary process performed by the mobile station utilizing the shadow addressing memory map.

FIG. 4 shows a flow chart illustrating an exemplary process 400 performed by the mobile station 300 utilizing the shadow addressing memory map 360. The PMIC 330 may first determine the power state of the mobile device (410). For example, the PMIC 330 may ascertain whether a controlled or uncontrolled power interruption occurred. If the power state is normal, and no power disruption occurred, the processor 310 may access the volatile memory 340 for normal reading and/or writing operations (420). Additionally, any data written to the shadowed portion of the volatile memory map 364 may be copied to the non-volatile memory 350 (425). This operation may be performed by the shadow copy controller 330 using the non-volatile memory map 365. If the PMIC determines a power interruption occurred, the memory controller 320 may be reconfigured so that during a restart, the processor may read initialization data from the non-volatile memory 350. In addition, security information may also be read from the non-volatile memory if security processes are being utilized by the processor 310. The power state information may be provided to the processor 310 in the form a Power Flag. Once the processor recovery from the power interruption is complete, the PMIC 330 may reevaluate the power state and determine that the power state has returned to normal, and thus normal operations (420, 425) may continue. It will be recognized that various actions described above can be performed by specific circuits (e.g., application specific integrated circuits (ASICs), floating point gate arrays, (FPGAs), etc.), by program instructions being executed by one or more processors (CPUs, DSPs, etc.), or by a combination of both.

Figure 5A:
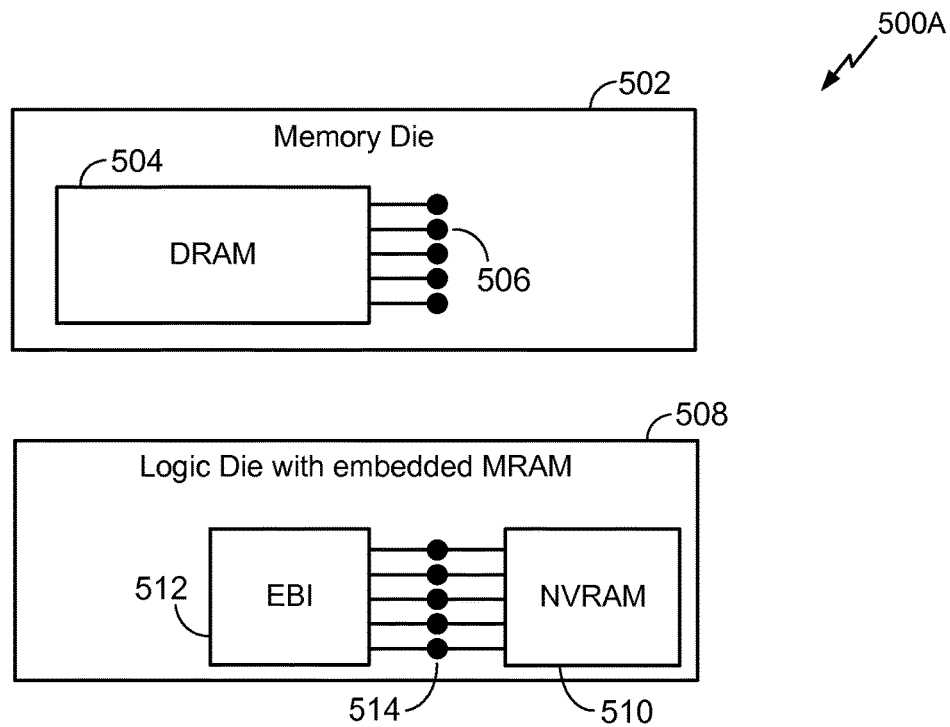
FIGS. 5A-B show block diagrams of exemplary memory packaging configurations associated with various embodiments.
Figure 5B:
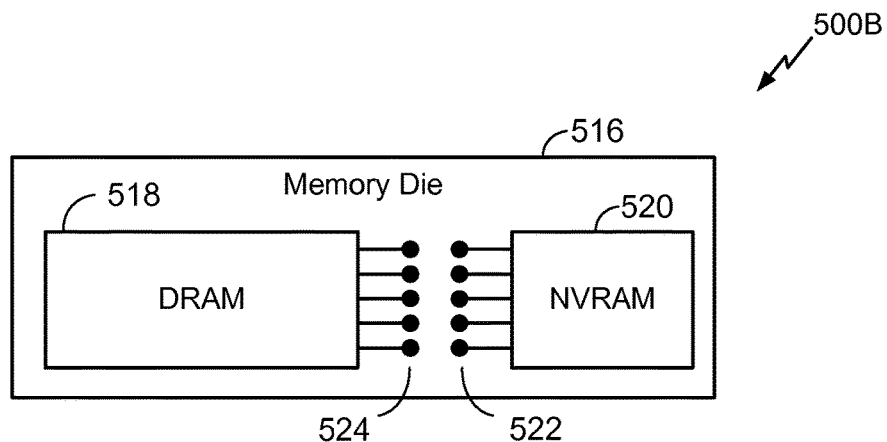

FIGS. 5A-5B show block diagrams of exemplary memory packaging configurations associated with various embodiments. In one embodiment illustrated in FIG. 5A, the volatile memory 504 may be associated with a separate memory die 502. An external bus interface (EBI) 512 and non-volatile memory 510 may be associated with a logic die 508, wherein the non-volatile memory is embedded therein. The volatile memory 504 may be associated with a first Through Silicon Via (TSV) interface 506, and the non-volatile memory 510, alone with the EBI 512 may be coupled to a second TSV interface 514. By stacking the memory die 502 on top of the logic die 508, an electrical connection between the memories 504, 510 and the EBI 512 may be established by interconnecting TSVs 506 and 514. In another embodiment shown in FIG. 5B, the volatile memory 518 and the non-volatile memory 520 may reside on a single memory die 516, and interface to an EBI (not shown) using TSVs 524 and 522.

Although shown as separate from the processor 210, the volatile memory 240 and/or non-volatile memory 250 may reside on the same die as the processor. Such packaging arrangements could reduce implementation size and power consumption. Accordingly it will be appreciated that the configurations illustrated and discussed herein are merely provided for convenience of explanation and the various embodiments are not limited to these examples.

The various memory modules can be stand alone devices or can be integrated or embedded within devices that use the memory, such as microprocessors, microcontrollers, application specific integrated circuits (ASICs), system-on-chip (SoC), and other like devices as will be appreciated by those skilled in the art.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment can include a computer readable media embodying a method for determining a power mode of the mobile device, determining that a power interruption did not occur based upon the power mode, accessing volatile memory for processing operations, and copying information stored in a predetermined portion of volatile memory into non-volatile memory.

While the foregoing disclosure shows illustrative embodiments, it should be noted that various changes and modifications could be made herein without departing from the scope of the invention as defined by the appended claims. The functions, steps and/or actions of the method claims in accordance with the embodiments described herein need not be performed in any particular order. Furthermore, although elements of the embodiments may be described or claimed in the singular, the plural is contemplated unless limitation to the singular is explicitly stated.

What is claimed is:

1. A mobile device, comprising:
   a volatile memory;
   a non-volatile memory comprising a Magnetoresistive Random Access Memory (MRAM);
   a memory controller functionally coupled to the non-volatile memory and the volatile memory; and
   a processor coupled to the memory controller,
   wherein the processor, during normal operation, addresses both the non-volatile memory and the volatile memory substantially at the same time utilizing a continuous memory map,
   wherein the processor, during normal operation, writes system-state information to the non-volatile memory and/or reads the system-state information from the non-volatile memory,
   wherein the processor, during normal operation, does not write the system-state information to the volatile memory, and
   wherein normal operation refers to a state where the mobile device performs routine operations after a cold-boot or an instant on process.

2. The mobile device of claim 1, wherein the memory controller comprises:
   a first memory controller coupled to the volatile memory; and
   a second memory controller coupled to the non-volatile memory,
   wherein the second memory controller allows the processor to address a section of the continuous memory map reserved for the non-volatile memory.

3. The mobile device of claim 1, wherein the non-volatile memory further comprises at least one of a Spin Transfer Torque MRAM (STT-MRAM) and a combination of the MRAM and STT-MRAM.

4. The mobile device of claim 1, wherein the processor writes instant-on information to the non-volatile memory and/or reads the instant-on information from the non-volatile memory.

5. The mobile device of claim 1, wherein the processor writes security information to the non-volatile memory and/or reads the security information from the non-volatile memory.

6. The mobile device of claim 1, wherein the processor writes digital rights management (DRM) information to the non-volatile memory and/or reads the DRM information from the non-volatile memory.

7. The mobile device of claim 1, wherein the volatile memory, the non-volatile memory, the memory controller and the processor are integrated into at least one semiconductor die.

8. A mobile device, comprising:
   a volatile memory;
   a non-volatile memory;
   a memory controller functionally coupled to the non-volatile memory and the volatile memory; and
   a processor coupled to the memory controller,
   wherein the processor, during normal operation, addresses both the non-volatile memory and the volatile memory utilizing a continuous memory map,
   wherein the processor, during normal operation, writes system-state information to the non-volatile memory and/or reads the system-state information from the non-volatile memory,
   wherein the processor, during normal operation, does not write the system-state information to the volatile memory, and
   wherein normal operation refers to a state where the mobile device performs routine operations after a cold-boot or an instant on process.

9. The mobile device of claim 8, wherein the memory controller comprises:
a first memory controller coupled to the volatile memory; and
a second memory controller coupled to the non-volatile memory,
wherein the second memory controller allows the processor to address a section of the continuous memory map reserved for the non-volatile memory.

10. The mobile device of claim 8, wherein the non-volatile memory further comprises at least one of a Spin Transfer Torque MRAM (STT-MRAM) and a combination of a Magnetoresistive Random Access Memory (MRAM) and the STT-MRAM.

11. The mobile device of claim 8, wherein the processor writes instant-on information to the non-volatile memory and/or reads the instant-on information from the non-volatile memory.

12. The mobile device of claim 8, wherein the processor writes security information to the non-volatile memory and/or reads the security information from the non-volatile memory.

13. The mobile device of claim 8, wherein the processor writes digital rights management (DRM) information to the non-volatile memory and/or reads the DRM information from the non-volatile memory.

14. The mobile device of claim 8, wherein the volatile memory, the non-volatile memory, the memory controller and the processor are integrated into at least one semiconductor die.

15. The mobile device of claim 8, wherein the processor addresses both the non-volatile memory and the volatile memory substantially at the same time utilizing the continuous memory map.

* * * * *